US010985419B2

(12) United States Patent
Yasuda et al.

(10) Patent No.: US 10,985,419 B2
(45) Date of Patent: Apr. 20, 2021

(54) BATTERY PACKAGING MATERIAL AND BATTERY

(71) Applicant: DAI NIPPON PRINTING CO., LTD., Tokyo (JP)

(72) Inventors: Daisuke Yasuda, Tokyo (JP); Takanori Yamashita, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 49 days.

(21) Appl. No.: 16/322,257

(22) PCT Filed: Aug. 4, 2017

(86) PCT No.: PCT/JP2017/028446
§ 371 (c)(1),
(2) Date: Jan. 31, 2019

(87) PCT Pub. No.: WO2018/026007
PCT Pub. Date: Feb. 8, 2018

(65) Prior Publication Data
US 2019/0198826 A1 Jun. 27, 2019

(30) Foreign Application Priority Data
Aug. 5, 2016 (JP) .............................. JP2016-155077

(51) Int. Cl.
*H01M 50/124* (2021.01)
*B27N 3/18* (2006.01)
(Continued)

(52) U.S. Cl.
CPC ............ *H01M 50/124* (2021.01); *B27N 3/18* (2013.01); *B32B 7/12* (2013.01); *B32B 15/09* (2013.01);
(Continued)

(58) Field of Classification Search
CPC ........ H01M 2/0287; B32B 7/12; B32B 27/08; B32B 27/36; B32B 15/09; B32B 15/20; C22C 21/00
See application file for complete search history.

(56) References Cited

U.S. PATENT DOCUMENTS

2008/0286635 A1 11/2008 Seino et al.
2012/0244421 A1 9/2012 Yamazaki et al.
(Continued)

FOREIGN PATENT DOCUMENTS

CN 202996917 U 6/2013
CN 104485430 A 4/2015
(Continued)

OTHER PUBLICATIONS

Oct. 3, 2017 International Search Report issued in International Patent Application No. PCT/JP2017/028446.
(Continued)

*Primary Examiner* — Matthew J Merkling
(74) *Attorney, Agent, or Firm* — Oliff PLC

(57) ABSTRACT

A battery packaging material which is slim, has excellent moldability, effectively prevents curl after molding, and moreover, is capable of imparting sufficient surface insulation to a battery. This battery packaging material is configured from a laminate which is at least provided with a polyester film layer, an aluminum alloy foil layer, and a thermally-fusible resin layer in this order. The thickness of the polyester film layer is 23-27 μm, the thickness of the aluminum alloy foil layer is 33-37 μm, the thickness of the thermally-fusible resin layer is 55-65 μm, the thickness of the laminate is 130 μm or less, and the insulation breakdown voltage of the polyester film layer-side surface is 13 kV or greater.

12 Claims, 3 Drawing Sheets

(51) Int. Cl.
  *B65H 20/04* (2006.01)
  *D04H 1/60* (2006.01)
  *D04H 1/732* (2012.01)
  *D21B 1/06* (2006.01)
  *D21F 7/06* (2006.01)
  *B32B 7/12* (2006.01)
  *B32B 15/09* (2006.01)
  *B32B 15/20* (2006.01)
  *B32B 27/08* (2006.01)
  *B32B 27/36* (2006.01)
  *C22C 21/00* (2006.01)
  *B29L 7/00* (2006.01)

(52) U.S. Cl.
  CPC .............. *B32B 15/20* (2013.01); *B32B 27/08* (2013.01); *B32B 27/36* (2013.01); *B65H 20/04* (2013.01); *C22C 21/00* (2013.01); *D04H 1/60* (2013.01); *D04H 1/732* (2013.01); *D21B 1/063* (2013.01); *D21F 7/06* (2013.01); *B29L 2007/008* (2013.01); *B32B 2307/31* (2013.01); *B32B 2457/10* (2013.01); *H01M 2220/20* (2013.01)

(56) References Cited

U.S. PATENT DOCUMENTS

| | | | | |
|---|---|---|---|---|
| 2013/0244088 | A1* | 9/2013 | Minamibori | B32B 15/085 |
| | | | | 429/175 |
| 2013/0280593 | A1* | 10/2013 | Hashimoto | B32B 27/36 |
| | | | | 429/163 |
| 2014/0255764 | A1* | 9/2014 | Minamibori | B32B 15/085 |
| | | | | 429/176 |
| 2014/0335404 | A1 | 11/2014 | Takada | |
| 2015/0207137 | A1* | 7/2015 | Zielke | H01M 2/365 |
| | | | | 429/156 |
| 2015/0232611 | A1 | 8/2015 | Manabe et al. | |
| 2016/0301040 | A1 | 10/2016 | Takahagi et al. | |
| 2016/0343999 | A1* | 11/2016 | Yonemura | H02J 7/24 |
| 2017/0005299 | A1* | 1/2017 | Kuramoto | H01M 2/0275 |
| 2017/0025647 | A1 | 1/2017 | Taniguchi | |
| 2017/0229684 | A1 | 8/2017 | Yasuda et al. | |
| 2017/0263899 | A1 | 9/2017 | Takahagi et al. | |
| 2019/0189978 | A1* | 6/2019 | Iwata | H01M 2/06 |

FOREIGN PATENT DOCUMENTS

| | | |
|---|---|---|
| EP | 2 645 449 A1 | 10/2013 |
| JP | H08-191023 A | 7/1996 |
| JP | 2006-066113 A | 3/2006 |
| JP | 2006-128038 A | 5/2006 |
| JP | 2008-287971 A | 11/2008 |
| JP | 2013-201027 A | 10/2013 |
| JP | 2013-222545 A | 10/2013 |
| JP | 2015-106528 A | 6/2015 |
| JP | 2016-071952 A | 5/2016 |
| JP | 2016-72160 A | 5/2016 |
| WO | 2014/069236 A1 | 5/2014 |
| WO | 2015/156327 A1 | 10/2015 |

OTHER PUBLICATIONS

Feb. 24, 2020 Search Report issued in European Patent Application No. 17837108.4.
May 14, 2019 Office Action issued in Japanese Patent Application No. 2018-532013.
Jan. 23, 2021 Office Action issued in Korean Patent Application No. 10-2019-7035468.

\* cited by examiner

BATTERY PACKAGING MATERIAL AND BATTERY

TECHNICAL FIELD

The present invention relates to a battery packaging material and a battery.

BACKGROUND ART

Various types of batteries have been developed heretofore, and in every battery, a packaging material is an essential member for sealing battery elements such as an electrode and an electrolyte. Metallic packaging materials have been often used heretofore as battery packages.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, a film-shaped laminate including a base material, an aluminum alloy foil layer and a heat-sealable resin layer laminated in this order has been proposed as a battery packaging material which is easily processed into diverse shapes and which can be thinned and lightened (see, for example, Patent Document 1).

In such a battery packaging material, generally, a recess portion is formed by cold molding, battery elements such as an electrode and an electrolytic solution are disposed in a space formed of the recess portion, and a heat-sealable resin layer is heat-weld to itself to obtain a battery with the battery elements stored in the battery packaging material. However, such a film-shaped packaging material is thinner as compared to a metallic packaging material, and has the disadvantage that pinholes and cracks easily occur during molding. If pinholes and cracks occur in a battery packaging material, an electrolytic solution may permeate to an aluminum alloy foil layer to form a metal precipitate, resulting in generation of a short-circuit, and therefore it is absolutely necessary that a film-shaped battery packaging material have a property that makes it hard to generate pinholes or the like during molding, i.e. excellent moldability. For this reason, in order to improve the moldability, a polyamide film may be used as a base material. Such a battery packaging material has been used mainly in small electric appliances such as mobile phones, smartphones, notebook personal computers and tablet computers heretofore, but in recent years, such a battery packaging material has tended to be also used in electromotive bicycles, automobiles, electrical storage devices and so on. Accordingly, batteries for which a battery packaging material is used have been progressively increased in size and capacity, and a plurality of batteries have tended to be modularized (a plurality of batteries have been stacked) for use (see, for example, Patent Document 2). However, a polyamide film that is widely used as a base material layer has a low insulation quality, and therefore when the base material layer is formed of a polyamide film, the insulation quality of modularized high-capacity batteries for use in automobiles etc. may be deteriorated. For example, when in some of modularized batteries, an insulation quality is deteriorated to cause discharge, adjacent other batteries may be ruptured, leading to impairment of battery functions. Particularly, batteries for use in automobiles etc. are required to have durability under a severe environment. However, a polyamide film has the problem that the insulation quality is more easily deteriorated under a high-humidity environment.

PRIOR ART DOCUMENTS

Patent Documents

Patent Document 1: Japanese Patent Laid-open Publication No. 2008-287971
Patent Document 2: Japanese Patent Laid-open Publication No. 2013-201027

SUMMARY OF THE INVENTION

Problems to be Solved by the Invention

In recent years, a battery packaging material has been desired to have a further reduced thickness as batteries have been required to have a reduced thickness. However, when the thickness of battery packaging material becomes thinner, pin holes and cracks unfortunately tend to occur during molding.

Particularly, vehicle batteries and the like are so large in size that a molded part formed during molding is characterized to increase in size, and also in depth. More pinholes and cracks tend to occur as the size of the molded part increases in size and depth, so that a battery packaging material to be used for large batteries such as vehicle batteries is required to have particularly excellent moldability.

Furthermore, the peripheral edge of a recess portion formed by molding of a battery packaging material is curled (curved) by the molding, so that storage of battery elements and heat-sealing of a heat-sealable resin layer may be hindered, leading to deterioration of production efficiency of batteries. Particularly, a battery packaging material to be used for large batteries such as vehicle batteries has the problem that since the battery packaging material has a large size and also the area of the peripheral edge of a recess portion increases, the impact of curl on productivity of batteries is very large.

Vehicle batteries and the like are usually used as a module in which a plurality of batteries are disposed. Therefore, a battery packaging material to be used for such batteries is also required to have a high surface insulation quality.

So far, a lithium-ion battery has been used for mobile devices that require currents of several hundred milliamperes to several amperes. For example, vehicle batteries require currents of several ten amperes to several hundred amperes. In addition, since on-vehicle batteries are used as a module in which a plurality of batteries are disposed, the insulation quality is required to be sufficiently high that when one of the batteries is damaged, adjacent batteries are not affected.

Under such circumstances, a main object of the present invention is to provide a battery packaging material which is slim, has excellent moldability, effectively prevents curling after molding, and moreover, is capable of imparting sufficient surface insulation quality to a battery.

Means for Solving the Problem

The present inventors have extensively conducted studies for achieving the above-mentioned object. As a result, it has been found that a battery packaging material configured from a laminate which is at least provided with a polyester film layer, an aluminum alloy foil layer and a heat-sealable resin layer in this order in which the thickness of the polyester film layer is 23 µm or more and 27 µm or less, the thickness of the aluminum alloy foil layer is 33 µm or more and 37 µm or less, the thickness of the heat-sealable resin layer is 55 µm or more and 65 µm or less, and the thickness of the laminate is 130 µm or less, and the dielectric breakdown voltage of the polyester film layer side is 13 kV or more is slim, has excellent moldability, effectively prevents curling after molding, and moreover, is capable of imparting sufficient surface insulation quality to a battery. The present invention has been completed by further conducting studies based on the above-mentioned findings.

That is, the present invention provides an invention of the aspects described below.

Item 1.

A battery packaging material configured from a laminate which is at least provided with a polyester film layer, an aluminum alloy foil layer and a heat-sealable resin layer in this order, wherein a thickness of the polyester film layer is 23 µm or more and 27 µm or less, a thickness of the aluminum alloy foil layer is 33 µm or more and 37 µm or less, a thickness of the heat-sealable resin layer is 55 µm or more and 65 µm or less, a thickness of the laminate is 130 µm or less, and a dielectric breakdown voltage of a surface on a side of the polyester film layer is 13 kV or more.

Item 2.

The battery packaging material according to item 1, wherein a dynamic friction coefficient of a surface on a side of the polyester film layer measured in accordance with the provisions of JIS K7125: 1995 is 0.25 or less.

Item 3.

The battery packaging material according to item 1 or 2, wherein the dynamic friction coefficient of a surface on a side of the heat-sealable resin layer measured in accordance with the provisions of JIS K7125: 1995 is 0.25 or less.

Item 4.

The battery packaging material according to any one of items 1 to 3, wherein a critical molded depth when molded under the following conditions is 4.0 mm or more.

A rectangular piece of the battery packaging material having a length of 150 mm and a width of 100 mm is used as a test sample. Using a rectangular female mold having an opening size of 55×32 mm and a corresponding male mold, the sample is cold-molded while the molded depth is changed by units of 0.5 mm from the molded depth of 0.5 mm under a surface-pressing force of 0.23 MPa. This procedure is carried out for each of the 10 samples. At this time, the test sample is placed on the female mold such that the side of the heat-sealable resin layer is positioned on the side of the male mold for molding. The clearance between the male and female molds is set to 0.5 mm. For the sample after the cold molding, the deepest molded depth at which no pinhole or crack occurs in the aluminum alloy foil layer for all 10 samples is defined as A mm, and the number of samples having a pinhole or crack generated in the aluminum alloy foil layer at the shallowest molded depth at which a pinhole or crack occurs is defined as B. Then, a value calculated by the following formula is taken as the critical molded depth for the battery packaging material.

Critical molded depth=$A$mm+(0.5 mm/10)×(10−$B$)

Item 5.

The battery packaging material according to any one of items 1 to 4, wherein a curl measured under the following conditions is 40 mm or less.

A rectangular piece of the battery packaging material having a length of 150 mm and a width of 100 mm is used as a test sample. Using a rectangular female mold having an opening size of 55×32 mm and a corresponding male mold, the sample is cold-molded while the molded depth is 6 mm under a surface-pressing force of 0.23 MPa. At this time, the test sample is placed on the female mold such that the side of the heat-sealable resin layer is positioned on the side of the male mold for molding. The clearance between the male and female molds is set to 0.5 mm. The position of a molded part M is a position where in the longitudinal direction of the battery packaging material, the shortest distance d between the rectangular molded part M formed by a die and the end part P of the battery packaging material becomes 72 mm, and in the width direction of the battery packaging material, the shortest distance between the molded part M and either end of the battery packaging material becomes 34 mm. When the molded battery packaging material is placed on a horizontal plane such that the opening of a recess portion of the molded part faces downward, the maximum value t of a distance in the vertical direction y from the horizontal plane to the end part P is defined as a curl (mm).

Item 6.

The battery packaging material according to any one of items 1 to 5, wherein the polyester film layer is configured from a stretched polyethylene terephthalate film.

Item 7.

The battery packaging material according to any one of items 1 to 6, wherein the heat-sealable resin layer is configured from a random polypropylene film.

Item 8.

The battery packaging material according to any one of items 1 to 7, wherein the aluminum alloy foil layer is configured from an aluminum alloy having the composition defined in JIS H4160: 1994 A8021H-O.

Item 9.

The battery packaging material according to any one of items 1 to 8, which is used for a vehicle battery.

Item 10.

A battery, wherein battery elements including a positive electrode, a negative electrode and an electrolyte are stored in a packaging formed of the battery packaging material according to any one of items 1 to 9.

Advantages of the Invention

According to the present invention, it is possible to provide a battery packaging material which is slim, has excellent moldability, effectively prevents curling after molding, and moreover, is capable of imparting sufficient surface insulation quality to a battery.

EMBODIMENTS OF THE INVENTION

A battery packaging material of the present invention is characterized by being configured from a laminate which is at least provided with a polyester film layer, an aluminum alloy foil layer, and a heat-sealable resin layer in this order, in which a thickness of the polyester film layer is 23 μm or more and 27 μm or less, a thickness of the aluminum alloy foil layer is 33 μm or more and 37 μm or less, a thickness of the heat-sealable resin layer is 55 μm or more and 65 μm or less, and a thickness of the laminate is 130 μm or less, and an insulation quality of the polyester film layer-side surface is 13 kV or more. Hereinafter, the battery packaging material of the present invention will be described in detail.

In this specification, the numerical range indicated by "-" means "not less than" and "not more than". For example, the expression 2-15 mm means 2 mm or more and 15 mm or less.

1. Laminated Structure of Battery Packaging Material

Figure 1:
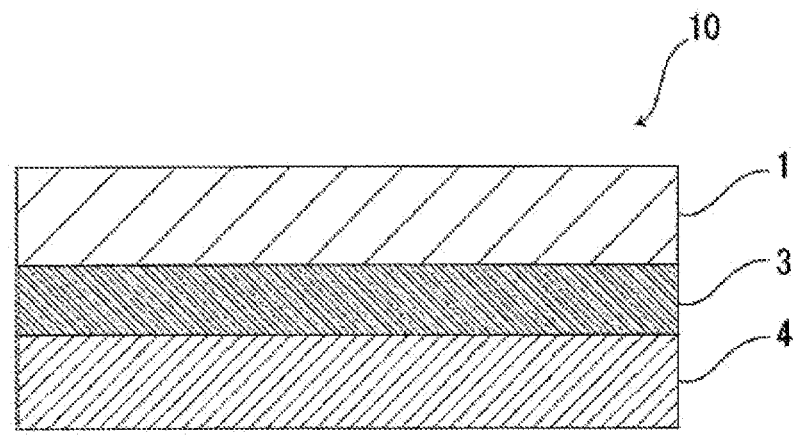
FIG. 1 is a drawing showing one example of a cross-sectional structure of a battery packaging material of the present invention.

As shown in FIG. 1 for example, a battery packaging material 10 of the present invention is configured from a laminate which is provided with a polyester film layer 1, an aluminum alloy foil layer 3 and a heat-sealable resin layer 4 in this order. In the battery packaging material of the present invention, the polyester film layer 1 is on an outermost layer side and the heat-sealable resin layer 4 is an innermost layer. That is, during construction of the battery, the heat-sealable resin layer 4 situated on the periphery of battery elements is heat-sealed to itself to hermetically seal the battery elements, so that the battery elements are encapsulated.

Figure 2:
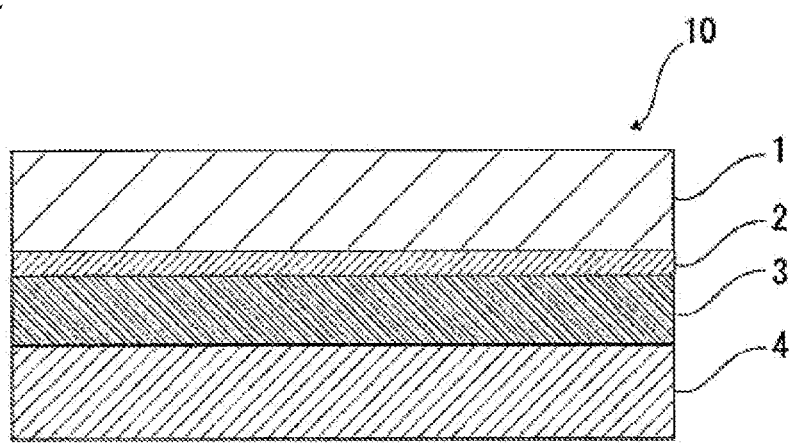
FIG. 2 is a drawing showing one example of a cross-sectional structure of a battery packaging material of the present invention.
Figure 3:
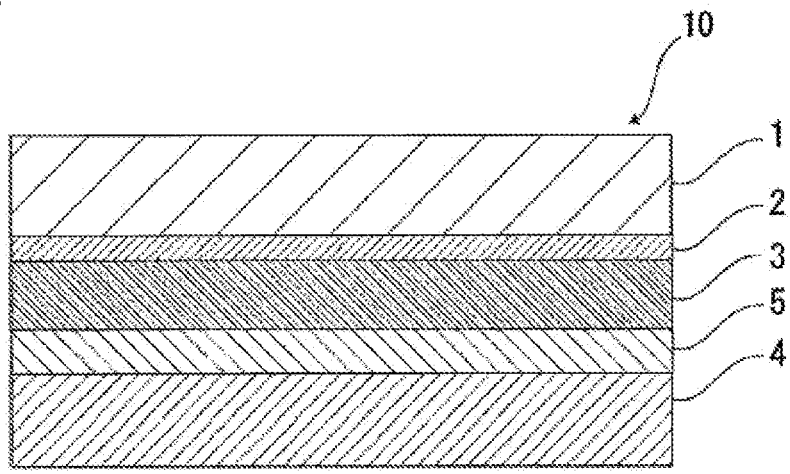
FIG. 3 is a drawing showing one example of a cross-sectional structure of a battery packaging material of the present invention.
Figure 4:
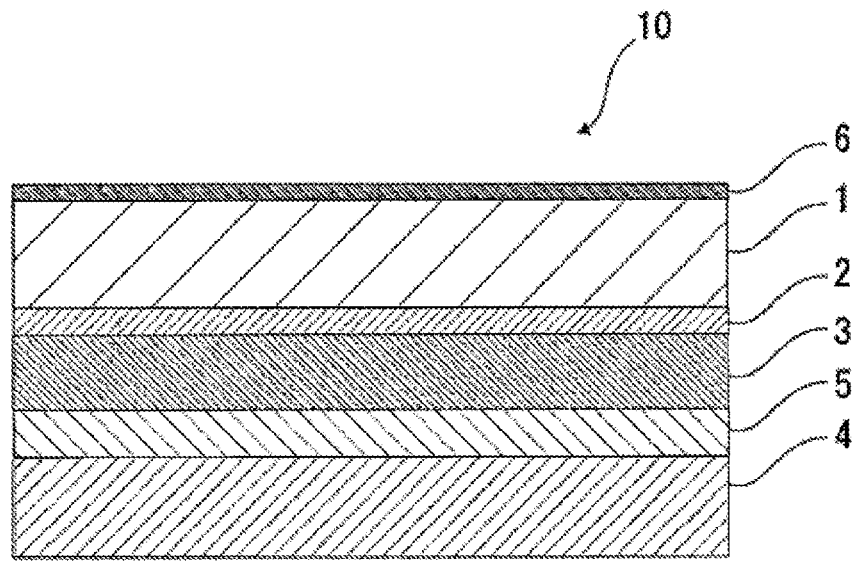
FIG. 4 is a drawing showing one example of a cross-sectional structure of a battery packaging material of the present invention.

As shown in FIG. 2 for example, the battery packaging material of the present invention may be provided with an adhesive agent layer 2 between the polyester film layer 1 and the aluminum alloy foil layer 3. In addition, as shown in FIG. 3, an adhesive layer 5 may be provided between the aluminum alloy foil layer 3 and the heat-sealable resin layer 4. Furthermore, as shown in FIG. 4, if necessary, a surface coating layer 6 may be provided on the outer side of the polyester film layer 1 (the side opposite to the heat-sealable resin layer 4).

The thickness of the laminate configuring the battery packaging material of the present invention is not particularly limited as long as it is 130 μm or less, but from the viewpoint of making the thickness of the laminate as thin as possible, while providing excellent moldability, further effectively preventing curling due to molding and enhancing the surface insulation quality, preferably about 110-130 m, more preferably about 114-130 μm.

From the viewpoint that the battery packaging material of the present invention exerts sufficient surface insulation quality, the dielectric breakdown voltage of the polyester film layer 1-side surface of the battery packaging material of the present invention is sufficiently 13 kV or more, but preferably 14 kV or more, more preferably 15 kV or more. In the present invention, the dielectric breakdown voltage is a value measured in accordance with the provisions of C2110-2: 2016, assuming that a test piece has a length of 100 mm and a width of 100 mm. Electrodes used for measurement are of 25 mm diameter column/25 mm diameter column. The dielectric breakdown voltage is specifically a value measured by the method described in examples.

In the battery packaging material of the present invention, the critical molded depth when molded under the following conditions is preferably about 4.0 mm or more, more preferably about 4.5 mm or more, still more preferably about 5.0 mm or more, particularly preferably about 5.5 mm or more. The upper limit of the critical molded depth is usually about 10.0 mm.

<Molding Condition>

A rectangular piece of the battery packaging material having a length of 150 mm and a width of 100 mm is used as a test sample. Using a rectangular female mold having an opening size of 55×32 mm and a corresponding male mold, the sample is cold-molded while the molded depth is changed by units of 0.5 mm from the molded depth of 0.5 mm under a surface-pressing force of 0.23 MPa. This procedure is carried out for each of the 10 samples. At this time, the test sample is placed on the female mold such that the heat-sealable resin layer side is positioned on the male mold side for molding. The clearance between the male and female molds is set to 0.5 mm. For the sample after the cold molding, the deepest molded depth at which no pinhole or crack occurs in the aluminum alloy foil layer for all 10 samples is defined as A mm, and the number of samples having a pinhole or crack generated in the aluminum alloy foil layer at the shallowest molded depth at which a pinhole or crack occurs is defined as B. Then, a value calculated by the following formula is taken as the critical molded depth for the battery packaging material. The method is more specifically described in Examples.

Critical molded depth=$A$mm+(0.5 mm/10 samples)× (10 samples−number $B$ of samples)

The battery packaging material of the present invention has a curl measured under the following conditions of preferably 40 mm or less.

<Measuring Condition for Curl due to Molding>

A rectangular piece of the battery packaging material having a length of 150 mm and a width of 100 mm is used as a test sample. Using a rectangular female mold having an opening size of 55×32 mm and a corresponding male mold, the sample is cold-molded while the molded depth is 6 mm under a surface-pressing force of 0.23 MPa. At this time, the test sample is placed on the female mold such that the heat-sealable resin layer side is positioned on the male mold side for molding. The clearance between the male and female molds is set to 0.5 mm. The position of the molded part M is a position where in the longitudinal direction of the battery packaging material, the shortest distance d between the rectangular molded part M formed by a die and the end part P of the battery packaging material becomes 72 mm, and in the width direction of the battery packaging material, the shortest distance between the molded part M and either end of the battery packaging material becomes 34 mm. When the molded battery packaging material is placed on a horizontal plane such that the opening of a recess portion of the molded part faces downward, the maximum value t of a distance in the vertical direction y from the horizontal plane to the end part P is defined as a curl (mm). The method is more specifically described in Examples.

2. Each Layer Forming Battery Packaging Material

[Polyester Film Layer 1]

In the battery packaging material of the present invention, the polyester film layer 1 is a layer which is positioned on an outermost layer side and functions as a base material layer. Specific examples of the polyester configuring the polyester film layer 1 include polyethylene terephthalate, polybutylene terephthalate, polyethylene naphthalate, polybutylene naphthalate, polyethylene isophthalate, polycarbonate, copolymerization polyesters including ethylene terephthalate as a main repeating unit, and copolymerization polyesters including butylene terephthalate as a main repeating unit. Specific examples of the copolymerization polyesters including ethylene terephthalate as a main repeating unit include copolymer polyesters that are polymerized with ethylene isophthalate and include ethylene terephthalate as a main repeating unit (hereinafter, abbreviated as polyethylene(terephthalate/isophthalate), and the others are also abbreviated in the same way), polyethylene(terephthalate/isophthalate), polyethylene(terephthalate/adipate), polyethylene(terephthalate/sodium sulfoisophthalate), polyethylene (terephthalate/sodium isophthalate), polyethylene (terephthalate/phenyl-dicarboxylate) and polyethylene(terephthalate/decane dicarboxylate). Specific examples of the copolymerization polyester including butylene terephthalate as a main repeating unit include copolymer polyesters that are polymerized with butylene isophthalate and include butylene terephthalate as a main repeating unit (hereinafter, abbreviated as polybutylene(terephthalate/isophthalate), and the others are also abbreviated in the same way), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. Polyesters have the advantage that they are excellent in electrolytic solution resistance, so that whitening etc. due to contact with an electrolytic solution is hard to occur, and thus are suitably used as a material for formation of the polyester film layer 1.

The polyester film layer 1 is preferably configured from a stretched polyester film such as a biaxially stretched polyester film, in particular, a stretched polyethylene terephthalate film such as a biaxially stretched polyethylene terephthalate film.

In the present invention, the thickness of the polyester film layer 1 is required to be 23-27 μm. In the present invention, the battery packaging material can be a battery packaging material having an excellent surface insulation quality with a dielectric breakdown voltage of 13 kV or more by using polyester film layer 1 as a base material layer and setting the thickness to 23 μm or more. In the present invention, from the viewpoint of enhancing the surface insulation quality of the battery packaging material, the thickness is preferably from 25-27 μm, and from the viewpoint of preventing curling due to molding, the thickness is preferably from 23-25 μm.

In the present invention, from the viewpoint of further improving the moldability, the dynamic friction coefficient of the polyester film layer 1-side surface is preferably 0.25 or less, more preferably 0.20 or less, still more preferably 0.05-0.20. A method for measuring the dynamic friction coefficient is the method in accordance with the provisions of JIS K7125: 1995, in which the surface of the polyester film layer 1 is overlapped over itself for measurement. The measuring method is specifically described in examples.

In the present invention, in order to set the dynamic friction coefficient of the polyester film layer 1-side surface to the above value, a lubricant may be present on the polyester film layer 1-side surface. When a lubricant is present on the surface of the polyester film layer 1, the amount is not particularly limited, but is preferably 3 mg/m$^2$ or more at a temperature of 24° C. and a relative humidity of 60%, more preferably 4 to 15 mg/m$^2$, still more preferably 5 to 14 mg/m$^2$.

A lubricant may be contained in the polyester film layer 1. A lubricant present on the surface of the polyester film layer 1 may be a leached lubricant contained in the resin conforming the polyester film layer 1 or a lubricant applied on the surface of the polyester film layer 1.

The lubricant is not particularly limited, but is preferably an amide-based lubricant. Specific examples of the lubricant include saturated fatty acid amides, unsaturated fatty acid amides, substituted amides, methylol amides, saturated fatty acid bis-amides and unsaturated fatty acid bis-amides. Specific examples of the saturated fatty acid amide include lauric acid amides, palmitic acid amides, stearic acid amides, behenic acid amides and hydroxystearic acid amides. Specific examples of the unsaturated fatty acid amide include oleic acid amides and erucic acid amides. Specific examples of the substituted amide include N-oleylpalmitic acid amides, N-stearylstearic acid amides, N-stearyloleic acid amides, N-oleylstearic acid amides and N-stearylerucic acid amides. Specific examples of the methylol amide include methylolstearic acid amides. Specific examples of the saturated fatty acid bis-amide include methylene-bis-stearic acid amides, ethylene-bis-capric acid amides, ethylene-bis-lauric acid amides, ethylene-bis-stearic acid amides, ethylene-bis-hydroxystearic acid amides, ethylene-bis-behenic acid amides, hexamethylene-bis-stearic acid amides, hexamethylene-bis-behenic acid amides, hexamethylene-hydroxystearic acid amides, N,N'-distearyladipic acid amides and N,N'-distearylsebacic acid amides. Specific examples of the unsaturated fatty acid bis-amide include ethylene-bis-oleic acid amides, ethylene-bis-erucic acid amides, hexamethylene-bis-oleic acid amides, N,N'-dioleyladipic acid amides and N,N'-dioleylsebacic acid amides. Specific examples of the fatty acid ester amide include stearamide ethyl stearates. Specific examples of the aromatic bis-amide include m-xylylene-bis-stearic acid amides, m-xylylene-bis-hydroxystearic acid amides and N,N'-distearylisophthalic acid amides. The lubricants may be used alone, or may be used in combination of two or more thereof.

[Adhesive Agent Layer 2]

In the battery packaging material of the present invention, the adhesive agent layer 2 is a layer provided between the polyester film layer 1 and the aluminum alloy foil layer 3 as necessary for strongly bonding these layers to each other.

The adhesive agent layer 2 is formed of an adhesive agent capable of bonding the polyester film layer 1 and the aluminum alloy foil layer 3 to each other. The adhesive agent may be a two-liquid curable adhesive agent, or may be a one-liquid curable adhesive agent. Furthermore, the adhesion mechanism of the adhesive agent used for forming the adhesive agent layer 2 is not particularly limited, and may be any one of a chemical reaction type, a solvent volatilization type, a heat melting type, a heat pressing type and so on.

Specific examples of the adhesive component that can be used for forming the adhesive agent layer 2 include polyester-based resins such as polyethylene terephthalate, polybutylene terephthalate, polyethylene naphthalate, polybutylene naphthalate, polyethylene isophthalate, polycarbonate and copolyesters; polyether-based adhesive agents; polyurethane-based adhesive agents; epoxy-based resins; phenol-based resins; polyamide-based resins such as nylon 6, nylon 66, nylon 12 and copolymerized polyamides; polyolefin-based resins such as polyolefins, carboxylic acid-modified polyolefins and metal-modified polyolefins, and polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesive agents are preferred.

The thickness of the adhesive agent layer 2 is not particularly limited as long as a function required of an adhesive layer is exerted, but is, for example, about 1-10 μm, preferably about 2-5 μm.

[Aluminum Alloy Foil Layer 3]

In the battery packaging material, the aluminum alloy foil layer 3 is a layer which is intended to improve the strength of the battery packaging material, and also functions as an aluminum alloy foil layer for preventing ingress of water vapor, oxygen, light and the like into a battery. The aluminum alloy foil layer 3 is made of an aluminum alloy. From the viewpoint of further improving the moldability of the battery packaging material and effectively preventing curling due to molding, the aluminum alloy foil layer 3 is preferably configured from a soft aluminum alloy such as an annealed aluminum alloy (JIS H4160: 1994 A8021H-O, JIS H4160: 1994 A8079H-O, JIS H4000: 2014 A8021 P-O, JIS H4000: 2014 A8079P-O). Among them, it is particularly preferably configured from an aluminum alloy having the composition defined in JIS H4160: 1994 A8021H-O.

The thickness of the aluminum alloy foil layer 3 is required to be in the range of 33-37 μm. From the viewpoint of more effectively preventing curling due to molding of the battery packaging material, the thickness is preferably 35-37 μm.

Preferably, at least one surface, preferably both surfaces, of the aluminum alloy foil layer 3 has been subjected to a chemical conversion treatment for stabilization of bonding, prevention of dissolution and corrosion, and so on. Here, the chemical conversion treatment is a treatment for forming an acid resistance film on the surface of the aluminum alloy foil layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by following formulae (1) to (4). In the aminated phenol polymer, the repeating units represented by following formulae (1) to (4) may be contained alone, or may be contained in combination of two or more thereof.

[Chemical Formula 1]

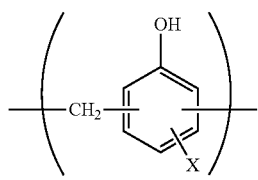

(1)

[Chemical Formula 2]

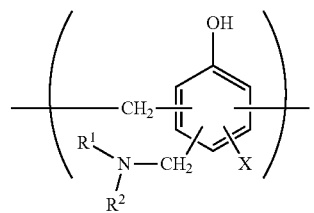

(2)

[Chemical Formula 3]

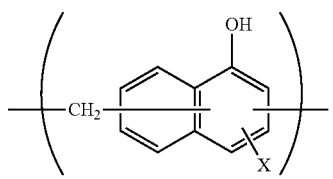

(3)

[Chemical Formula 4]

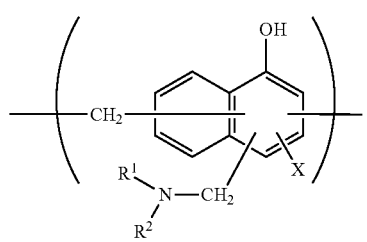

(4)

In formulae (1) to (4), X represents a hydrogen atom, a hydroxyl group, an alkyl group, a hydroxyalkyl group, an allyl group or a benzyl group. $R^1$ and $R^2$ are the same as or different from each other, and each represents a hydroxyl group, an alkyl group or a hydroxyalkyl group. In formulae (1) to (4), examples of the alkyl group represented by X, $R^1$ and $R^2$ include linear or branched alkyl groups with a carbon number of 1 to 4, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In formulae (1) to (4), the alkyl group and the hydroxyalkyl group represented by X, $R^1$ and $R^2$ may be the same as or different from each other. In formulae (1) to (4), X is preferably a hydrogen atom, a hydroxyl group or a hydroxyalkyl group. The number average molecular weight of the aminated phenol polymer having repeating units represented by formulae (1) to (4) is preferably 500-1000000, and more preferably 1000-20000, for example.

In addition, the chemical conversion treatment method for imparting corrosion resistance to the aluminum alloy foil layer 3 include a method in which the aluminum alloy foil layer 3 is coated with a dispersion of fine particles of a metal oxide such as aluminum oxide, titanium oxide, cerium oxide or tin oxide or barium sulfate in phosphoric acid, followed by annealing at 150° C. or higher to form a corrosion resistance treatment layer on the surface of the aluminum alloy foil layer 3. A resin layer with a cationic polymer crosslinked via a crosslinking agent may be further formed on the corrosion resistance treatment layer. Here, examples of the cationic polymer include polyethyleneimine, ion polymer complexes made of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among the chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the aluminum alloy foil layer 3 in the chemical conversion treatment is not particularly limited, but for example, when the above-mentioned chromate treatment is performed, it is desirable that the chromic acid compound be contained in an amount of 0.5-50 mg, preferably about 1.0-40 mg, in terms of chromium, the phosphorus compound be contained in an amount of about 0.5-50 mg, preferably about 1.0-40 mg, in terms of phosphorus, and the aminated phenol polymer be contained in an amount of about 1-200 mg, preferably about 5.0-150 mg, per 1 $m^2$ on the surface of the aluminum alloy foil layer 3.

The chemical conversion treatment is performed in the following manner: a solution containing a compound to be used for formation of an acid resistance film is applied onto the surface of the aluminum alloy foil layer by a bar coating method, a roll coating method, a gravure coating method, an immersion method or the like, and heating is then performed such that the temperature of the aluminum alloy foil layer is 70° C.-200° C. The aluminum alloy foil layer may be subjected to a degreasing treatment by an alkali immersion method, an electrolytic cleaning method, an acid cleaning method, an electrolytic acid cleaning method or the like before the aluminum alloy foil layer is subjected to the chemical conversion treatment. When a degreasing treatment is performed as described above, the chemical conversion treatment of the surface of the aluminum alloy foil layer can be more efficiently performed.

[Heat-Sealable Resin Layer 4]

In the battery packaging material of the present invention, the heat-sealable resin layer 4 corresponds to the innermost layer, and during construction of a battery, the heat-sealable resin layer is heat-sealed to itself to hermetically seal battery elements.

The resin component to be used in the heat-sealable resin layer 4 is not particularly limited as long as it is heat-sealable, and examples thereof include polyolefins, cyclic polyolefins, acid-modified polyolefins and acid-modified cyclic polyolefins. That is, the heat-sealable resin layer 4 may contain a polyolefin skeleton or otherwise, but preferably contains a polyolefin skeleton. It can be analyzed whether the heat-sealable resin layer 4 contains a polyolefin skeleton by any analyzing method including, but not particularly limited to, infrared spectroscopy or gas chromatography mass spectrometry. For example, when a maleic anhydride-modified polyolefin is measured by infrared spectroscopy, peaks derived from maleic anhydride are detected in the vicinity of a wave number of 1760 $cm^{-1}$ and a wave number of 1780 $cm^{-1}$. However, when the degree of acid modification is low, the peak may be too small to be detected. In that case, nuclear magnetic resonance spectroscopy permits the analysis.

Specific examples of the polyolefin include polyethylenes such as low-density polyethylene, medium-density polyethylene, high-density polyethylene and linear low-density polyethylene; polypropylenes such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylenes are preferred, and random polypropylenes are more preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an $\alpha,\beta$-unsaturated carboxylic acid or an anhydride thereof for replacing a part of monomers that form the cyclic polyolefin, or by block-polymerizing or graft-polymerizing an $\alpha,\beta$-unsaturated carboxylic acid or an anhydride thereof with the cyclic polyolefin. The cyclic polyolefin to be modified with a carboxylic acid is the same as described above. The carboxylic acid to be used for modification is the same as that used for modification of the polyolefin.

It is particularly preferable that the heat-sealable resin layer 4 be configured from a random polypropylene film.

The heat-sealable resin layer 4 may be formed of one resin component alone, or may be formed of a blend polymer obtained by combining two or more resin components. Furthermore, the heat-sealable resin layer 4 may be formed of only one layer, or may be formed of two or more layers with the same resin component or different resin components.

In the present invention, the thickness of the heat-sealable resin layer 4 is required to be about 55-65 μm, and from the viewpoint of further improving the moldability and effectively preventing curling after molding, it is preferably about 57-60 μm.

In the present invention, from the viewpoint of further improving the moldability, the dynamic friction coefficient of the heat-sealable resin layer 4-side surface is preferably about 0.25 or less, more preferably about 0.20 or less, still more preferably about 0.05-0.20. A method for measuring the dynamic friction coefficient is the method in accordance with the provisions of JIS K7125: 1995, in which the heat-sealable resin layer 4 is overlapped over itself for measurement. The measuring method is specifically described in examples.

In the present invention, a lubricant may be present on the heat-sealable resin layer 4-side surface in order to set the dynamic friction coefficient of the heat-sealable resin layer 4-side surface to the above value. When a lubricant is present on the surface of the heat-sealable resin layer 4, the amount is not particularly limited, but is preferably about 3 mg/m$^2$ or more at a temperature of 24° C. and a relative humidity of 60%, more preferably about 4-15 mg/m$^2$, still more preferably about 5-14 mg/m$^2$.

A lubricant may be contained in the heat-sealable resin layer 4. A lubricant present on the surface of the heat-sealable resin layer 4 may be a leached lubricant contained in the resin conforming the heat-sealable resin layer 4 or a lubricant applied on the surface of the heat-sealable resin layer 4.

The lubricant is not particularly limited, but a known lubricant may be used, and examples thereof include those shown above as examples for polyester film layer 1. The lubricants may be used alone, or may be used in combination of two or more thereof.

[Adhesive Layer 5]

In the battery packaging materials of the present invention, the adhesive layer 5 is a layer provided between the aluminum alloy foil layer 3 and the heat-sealable resin layer 4 as necessary for strongly bonding these layers to each other.

The adhesive layer 5 is formed of a resin capable of bonding the aluminum alloy foil layer 3 and the heat-sealable resin layer 4 to each other. As for the resin used for forming the adhesive layer 5, the adhesive mechanism, the type of the adhesive component and the like can be the same as those of the adhesive agents exemplified for the adhesive agent layer 2. As the resin used for forming the adhesive layer 5, polyolefin-based resins such as polyolefins, cyclic polyolefins, carboxylic acid-modified polyolefins and carboxylic acid-modified cyclic polyolefins exemplified for the above-mentioned heat-sealable resin layer 4 can also be used. From the viewpoint of excellent adhesion of the aluminum alloy foil layer 3 to the heat-sealable resin layer 4, the polyolefin is preferably a carboxylic acid-modified polyolefin, particularly preferably a carboxylic acid-modified polypropylene. That is, the adhesive layer 5 may contain a polyolefin skeleton or otherwise, but preferably contains a polyolefin skeleton. It can be analyzed whether the adhesive layer 5 contains a polyolefin skeleton by any analyzing method including, but not particularly limited to, infrared spectroscopy or gas chromatography mass spectrometry. For example, when a maleic anhydride-modified polyolefin is measured by infrared spectroscopy, peaks derived from maleic anhydride are detected in the vicinity of a wave number of 1760 cm$^{-1}$ and a wave number of 1780 cm$^{-1}$. However, when the degree of acid modification is low, the peak may be too small to be detected. In that case, nuclear magnetic resonance spectroscopy permits the analysis.

Furthermore, from the viewpoint of reducing the thickness of the battery packaging material and making the battery packaging material excellent in shape stability such that curling after molding is effectively prevented, the adhesive layer 5 may be a cured product of a resin composition containing an acid-modified polyolefin and a curing agent. Preferable examples of the acid-modified polyolefin can include the same ones as exemplified for the carboxylic acid-modified polyolefin and the carboxylic acid-modified cyclic polyolefin in the heat-sealable resin layer 4.

The curing agent is not particularly limited as long as it cures an acid-modified polyolefin. Examples of the curing agent include epoxy-based curing agents, polyfunctional isocyanate-based curing agents, carbodiimide-based curing agents and oxazoline-based curing agents.

The epoxy-based curing agent is not particularly limited as long as it is a compound having at least one epoxy group. Examples of the epoxy-based curing agent include epoxy resins such as bisphenol A diglycidyl ether, modified bisphenol A diglycidyl ether, novolak glycidyl ether, glycerin polyglycidyl ether and polyglycerin polyglycidyl ether.

The polyfunctional isocyanate-based curing agent is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers.

The carbodiimide-based curing agent is not particularly limited as long as it is a compound having at least one carbodiimide group (—N=C=N—). The carbodiimide-based curing agent is preferably a polycarbodiimide compound having at least two carbodiimide groups.

The oxazoline-based curing agent is not particularly limited as long as it is a compound having an oxazoline backbone. Specific examples of the oxazoline-based curing agent include EPOCROS Series from Nippon Shokubai Co., Ltd.

From the viewpoint of enhancing the adhesion of the aluminum alloy foil layer 3 to the heat-sealable resin layer 4 via the adhesive layer 5, etc., the curing agent may be made of two or more kinds of compounds.

The content of the curing agent in the resin composition forming the adhesive layer 5 is preferably in the range of 0.1-50 mass %, more preferably in the range of about 0.1-30 mass %, still preferably in the range of about 0.1-10 mass %.

The thickness of the adhesive layer 5 is not particularly limited as long as a function required of an adhesive layer is exerted, but is, when the adhesive agent exemplified for the adhesive agent layer 2 is used, preferably about 2-10 µm, more preferably about 2-5 µm. When the resin exemplified for the heat-sealable resin layer 4 is used, the thickness is preferably about 2-50 µm, more preferably about 10-40 µm. In addition, when the adhesive layer 5 is a cured product of an acid-modified polyolefin and a curing agent, the thickness is preferably about 30 µm or less, more preferably about 0.1-20 µm, still preferably about 0.5-5 µm. When the adhesive layer 5 is a cured product of a resin composition containing an acid-modified polyolefin and a curing agent, the adhesive layer 5 can be formed by applying the resin composition, followed by curing by heating or the like.

[Surface Coating Layer 6]

In the battery packaging materials of the present invention, the surface coating layer 6 may be provided on the polyester film layer 1 (on the side opposite to the aluminum alloy foil layer 3 of the polyester film layer 1) as necessary for the purpose of, for example, improving the designability, electrolytic solution resistance, scratch resistance and moldability. The surface coating layer 6 is a layer that is situated at an outermost layer when a battery is constructed.

The surface coating layer 6 can be formed of, for example, polyvinylidene chloride, a polyester resin, a urethane resin, an acrylic resin, an epoxy resin or the like. Preferably, the surface coating layer 6 is formed of a two-liquid curable resin among the resins described above. Examples of the two-liquid curable resin that forms the surface coating layer 6 include two-liquid curable urethane resins, two-liquid curable polyester resins and two-liquid curable epoxy resins. Furthermore, an additive agent may be blended in the surface coating layer 6.

Examples of the additive agent include fine particles having a particle size of 0.5-5 μm. The material of the additive agent is not particularly limited, but examples of the material include metals, metal oxides, inorganic substances and organic substances. The shape of the additive agent is not particularly limited, but examples of the shape include a spherical shape, a fibrous shape, a plate shape, an amorphous shape and a balloon shape. Specific examples of the additive agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These additive agents may be used alone, or may be used in combination of two or more thereof. Among these additive agents, silica, barium sulfate and titanium oxide are preferred from the viewpoint of dispersion stability, costs and so on. The surface of the additive agent may have been subjected to various kinds of surface treatments such as an insulation treatment and dispersibility enhancing treatment.

A method for forming the surface coating layer 6 is not particularly limited, but examples of the method include a method in which a two-liquid curable resin for forming the surface coating layer 6 is applied onto one surface of the polyester film layer 1. When the additive agent is blended, the additive agent may be added to and mixed with the two-liquid curable resin, followed by application.

The thickness of the surface coating layer 6 is not particularly limited as long as the above-mentioned function required of the surface coating layer 6 is exerted, but is, for example, about 0.5-10 μm, preferably about 1-5 μm.

3. Method for Producing Battery Packaging Material

A method for producing the battery packaging material of the present invention is not particularly limited as long as a laminate in which layers each having a predetermined composition are laminated is obtained. That is, in the method for producing a battery packaging material of the present invention, the step is included of providing a laminate by laminating at least the polyester film layer, the aluminum alloy foil layer, and the heat-sealable resin layer in this order each having the above-mentioned thickness.

An example of the method for producing a battery packaging material of the present invention is as follows. First, a laminate in which the polyester film layer 1, the adhesive agent layer 2 and the aluminum alloy foil layer 3 are laminated in this order (hereinafter, the laminate may also be described as "laminate A") is formed. Specifically, the laminate A can be formed by a dry laminating method in which the adhesive agent to be used for formation of the adhesive agent layer 2 is applied onto the polyester film layer 1 or the aluminum alloy foil layer 3, the surface of which the aluminum alloy foil layer 3 has been subjected to a chemical conversion treatment as necessary, using an applying method such as a gravure coating method or a roll coating method, and dried, subsequently the aluminum alloy foil layer 3 or the polyester film layer 1 is laminated, and the adhesive agent layer 2 is cured.

Next, on the aluminum alloy foil layer 3 of laminate A, the adhesive layer 5 and the heat-sealable resin layer 4 are laminated in this order. This is achieved, for example, by (1) a method in which the adhesive layer 5 and the heat-sealable resin layer 4 are co-extruded to be laminated on the aluminum alloy foil layer 3 of the laminate A (co-extrusion laminating method); (2) a method in which the adhesive layer 5 and the heat-sealable resin layer 4 are laminated to previously form a laminate, and the laminate is laminated on the aluminum alloy foil layer 3 of the laminate A by a thermal laminating method; (3) a method in which the adhesive layer 5 is laminated on the aluminum alloy foil layer 3 of the laminate A by, for example, a method for applying an adhesive agent for formation of the adhesive layer 5 onto the aluminum alloy foil layer 3 with an extrusion method or solution coating, and drying and further baking adhesive agent-applied aluminum alloy foil layer 3 at a high temperature, and the heat-sealable resin layer 4 formed in a sheet-shaped film beforehand is laminated on the adhesive layer 5 by a thermal laminating method; and (4) a method in which the melted adhesive layer 5 is poured between the aluminum alloy foil layer 3 of the laminate A and the heat-sealable resin layer 4 formed in a sheet-shaped film beforehand, and simultaneously laminate A and the heat-sealable resin layer 4 are bonded to each other via the adhesive layer 5 (sandwich laminating method).

When the surface coating layer 6 is provided, the surface coating layer 6 is laminated on the surface of the polyester film layer 1 opposite to the aluminum alloy foil layer 3. The surface coating layer 6 can be formed by, for example, applying the above-mentioned resin for forming the surface coating layer 6 onto the surface of the polyester film layer 1. The order of the step of laminating the aluminum alloy foil layer 3 on the surface of the polyester film layer 1 and the step of laminating the surface coating layer 6 on the surface of the polyester film layer 1 is not particularly limited. For example, after forming the surface coating layer 6 on the surface of the polyester film layer 1, the aluminum alloy foil layer 3 may be formed on the surface of the polyester film layer 1 opposite to the surface coating layer 6.

A laminate including the surface coating layer 6 provided as necessary, the polyester film layer 1, the adhesive agent layer 2, the aluminum alloy foil layer 3, the surface of which has been subjected to a chemical conversion treatment as necessary, the adhesive layer 5 provided as necessary, and the heat-sealable resin layer 4 is formed in the manner described above, and the laminate may be further subjected to a heating treatment such as a hot roll contact type, a hot air type, or a near- or far-infrared type one for strengthening the adhesion of the adhesive agent layer 2 or the adhesive layer 5. As conditions for such a heating treatment, for example, the temperature is about 150-about 250° C., and the time period is about 1-5 minutes.

In the battery packaging material of the present invention, the layers that form the laminate may have been subjected to a surface activation treatment such as a corona treatment, a blast treatment, an oxidation treatment or an ozone treatment as necessary for improving or stabilizing the film formability, lamination processing suitability, final product secondary processing (pouching and embossing molding) suitability, and the like.

4. Use of Battery Packaging Material

The battery packaging material of the present invention is used for a packaging for hermetically sealing and storing battery elements such as a positive electrode, a negative electrode and an electrolyte. That is, a battery can be obtained by storing battery elements including at least a positive electrode, a negative electrode and an electrolyte in a packaging formed of the battery packaging material of the present invention.

Specifically, battery elements including at least a positive electrode, a negative electrode and an electrolyte are covered with the battery packaging material of the present invention such that a flange portion (region where a heat-sealable resin layer is in contact with itself) can be formed on the periphery of the battery elements while a metal terminal connected to each of the positive electrode and the negative electrode protrudes to the outside, and the heat-sealable resin layer at the flange portion is hermetically heat-sealed with itself, thereby providing a battery including the battery packaging material. When battery elements are stored in a packaging formed of the battery packaging material of the present invention, a heat-sealable resin portion of the battery packaging material of the present invention is on the inner side (the surface in contact with the battery elements) to form the packaging.

The battery packaging material of the present invention may be used for either primary batteries or secondary batteries, but is preferably used for secondary batteries. The type of secondary batteries to which the battery packaging material of the present invention is applied is not particularly limited, and examples of the secondary battery include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material of the present invention is applied include lithium ion batteries and lithium ion polymer batteries.

Particularly, because the battery packaging material of the present invention is slim, has excellent moldability, effectively prevents curling after molding, and moreover, is capable of imparting sufficient surface insulation quality to a battery, it can be suitably used for large batteries such as a vehicle battery. Particularly, batteries to which the battery packaging material of the present invention can be suitably applied include large batteries having a battery capacity of 30 Ah or more. In addition, the battery packaging material of the present invention can be suitably used for batteries to be disposed in a module in which a plurality of batteries are disposed.

EXAMPLES

The present invention will be described in detail below by showing examples and comparative examples. It is to be noted that the present invention is not limited to examples. Examples 1 to 52 and Comparative Examples 1 to 146
<Production of Battery Packaging Material>

On each of base material layers configured from resin films described in Tables 1 to 4, an aluminum alloy foil of an aluminum alloy foil (JIS H4160: 1994 A8021H-O) both surfaces of which had been subjected to a chemical conversion treatment was laminated by a dry laminating method. Specifically, a two-liquid type urethane adhesive agent (a polyol compound and an aromatic isocyanate-based compound) was applied to one surface of the aluminum alloy foil to form an adhesive agent layer (thickness: 3 μm) on an aluminum alloy foil layer. Subsequently, the adhesive agent layer on the aluminum alloy foil layer and the base material layer were laminated and then aged at 40° C. for 24 hours to produce a laminate of the base layer, adhesive agent layer, aluminum alloy foil layer. The chemical conversion treatment for the aluminum alloy foil was performed by applying to both of the surfaces of the aluminum foil a treatment liquid including a phenol resin, a chromium fluoride compound and phosphoric acid using a roll coating method in such a manner that the applied amount of chromium was 10 mg/m$^2$ (dry mass), followed by baking.

Next, on the aluminum alloy foil layer of the obtained laminate, an acid-modified polypropylene and a random polypropylene as a heat-sealable resin layer was melted and extruded (note that the acid-modified polypropylene and the random polypropylene have the same thickness) to laminate a heat-sealable resin layer on the aluminum alloy foil. Next, the obtained laminate was aged to produce a battery packaging material including a base material layer, an adhesive agent layer, an aluminum alloy foil layer and a heat-sealable resin layer laminated in this order. The thickness of each layer of the battery packaging material is as described in Tables 1 to 4.
<Measurement of Dynamic Friction Coefficient>

For each battery packaging material, the dynamic friction coefficients of the polyester film layer-side surface and the heat-sealable resin layer-side surface were each measured in accordance with the provisions of JIS K7125: 1995. Each of the battery packaging materials was cut into two rectangular pieces having a length (z direction) of 80 mm×a width (x direction) of 200 mm to prepare a pair of samples. Then, the surfaces of the polyester film layers of a pair of samples were overlapped over each other and the dynamic friction coefficient of the polyester film layer-side surface was measured. Similarly, the dynamic friction coefficient of the heat-sealable resin layer-side surface was measured by overlapping the surfaces of the heat-sealable resin layers over each other. The results are shown in Tables 1-4.
<Measurement of Dielectric Breakdown Voltage>

For the stretched polyethylene terephthalate film-side surface of each of the above-obtained battery packaging materials, in accordance with the provisions of JIS C2110-2: 2016, the dielectric breakdown voltage (kV) was measured. The length of the test piece was 100 mm, and the width was 100 mm. As a dielectric breakdown test apparatus, YST-243-100RHO (manufactured by Yamayoshikenki com.) was used. The results are shown in Tables 1-4.
Test Conditions
Pressure boosting method: short-time method
Pressure boosting rate: 0.5 kv/sec
Ambient medium: air (23° C.)
Test electrode: 25 mm diameter column/25 mm diameter column
Test environment: (23° C.±2)° C.•(50±5)% RH
<Evaluation of Moldability>

Each of the above-obtained battery packaging materials was cut into a rectangular piece having a length (z direction) of 150 mm×a width (x direction) of 100 mm to prepare a test sample. Cold molding (draw-in one-step molding) was carried out for 10 samples each using a rectangular molding die having an opening size of 32 mm (x direction)×55 mm (z direction) (female mold, the surface has a maximum height roughness (nominal value of Rz) of 3.2 μm specified in Table 2 of JIS B 0659-1: 2002 Appendix 1 (Referential) Surface Roughness Standard Specimens for Comparison) and a corresponding molding die (male mold, the surface has a maximum height roughness (nominal value of Rz) of 1.6 μm specified in Table 2 of JIS B 0659-1: 2002 Appendix 1

(Referential) Surface Roughness Standard Specimens for Comparison) while the molded depth was changed by units of 0.5 mm from the molded depth of 0.5 mm under a surface-pressing force of 0.23 MPa. At this time, the test sample was placed on the female mold such that the heat-sealable resin layer side was positioned on the male mold side for molding. The clearance between the male and female molds was set to 0.5 mm. For the sample after the cold molding, the deepest molded depth at which no pinhole or crack occurs in the aluminum alloy foil for all 10 samples was defined as A mm, and the number of samples having a pinhole or the like generated in the aluminum alloy foil at the shallowest molded depth at which a pinhole or the like occurs was defined as B. Then, a value calculated by the following formula was taken as the critical molded depth (mm) for the battery packaging material. The results are shown in Tables 1-4.

Critical molded depth=$A$mm+(0.5 mm/10 samples)× (10 samples−$B$ of samples)

<Evaluation of Curling After Molding>

Figure 5:
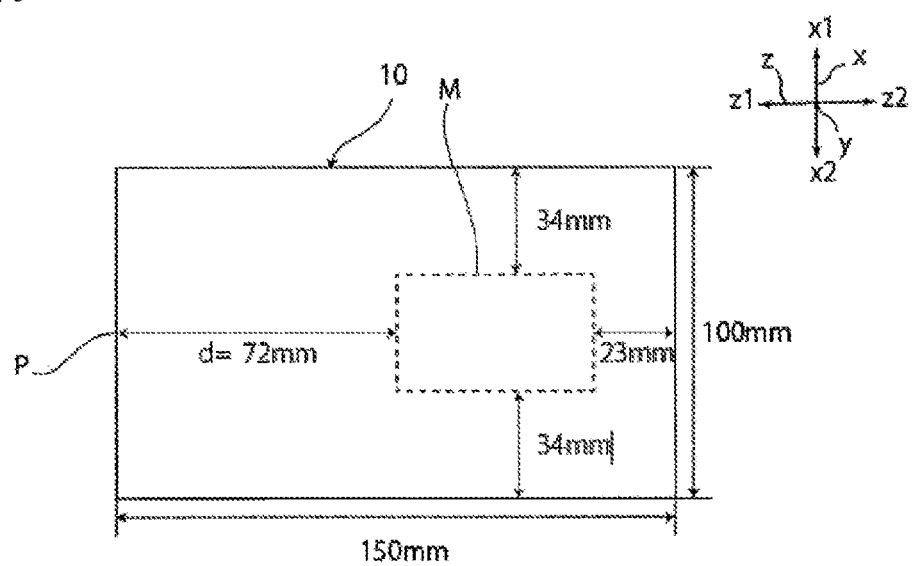
FIG. 5 is a schematic view for describing a method for evaluation on curling.
Figure 6:
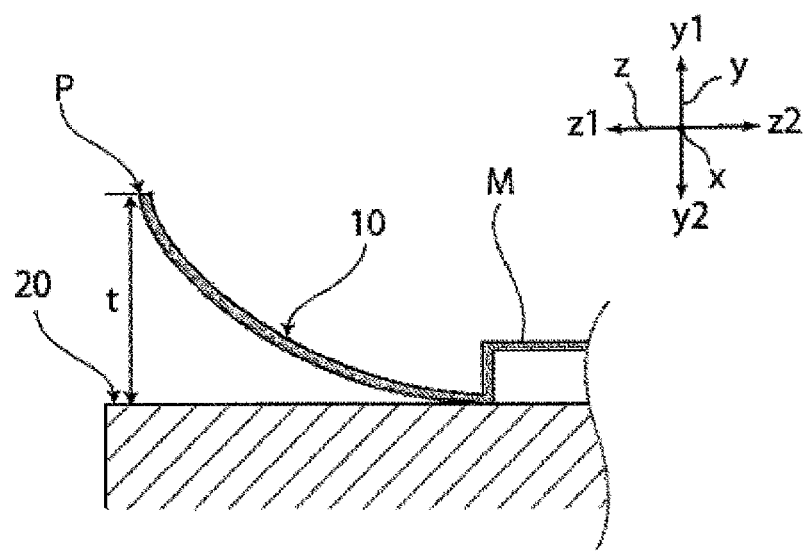
FIG. 6 is a schematic view for describing a method for evaluation on curling.

Each of the above-obtained battery packaging materials was cut into a strip piece having a length (z direction) of 150 mm×a width (x direction) of 100 mm to prepare a test sample. The sample was cold molded (draw-in one-step molding) using a rectangular female mold having an opening size of 55×32 mm and a corresponding male mold while the molded depth was 6 mm under a surface-pressing force of 0.23 MPa. At this time, the test sample was placed on the female mold such that the heat-sealable resin layer side is positioned on the male mold side for molding. The clearance between the male and female molds was set to 0.5 mm. Details of the position at which molding was performed are as shown in FIG. 5. As shown in FIG. 5, molding was performed at a position where the shortest distance d between the rectangular molded part M and the end part P of the battery packaging material 10 equals 72 mm (d=72 mm), and in the width direction of the battery packaging material, the shortest distance between the molded part M and both end parts of the battery packaging material was 34 mm. Next, the battery packaging material 10 after molding was placed on the horizontal plane 20 in a manner as shown in FIG. 6, and the maximum value t of a distance between the horizontal plane 20 and the end part P in vertical direction y was defined as the maximum height of a curled portion (molded curl (mm)). The results are shown in Tables 1-4.

TABLE 1

| | Base material layer | | | Aluminum alloy foil | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | Thickness (μm) | Thickness (μm) | Thickness (μm) | | | | |
| Example 1 | PET | 23 | 0.20 | 37 | 55 | 0.20 | 118 | 13 | 5.5 | 30 |
| Example 2 | PET | 25 | 0.20 | 37 | 55 | 0.20 | 120 | 14 | 5.5 | 34 |
| Example 3 | PET | 27 | 0.20 | 37 | 55 | 0.20 | 122 | 15 | 5.5 | 37 |
| Example 4 | PET | 23 | 0.20 | 35 | 55 | 0.20 | 116 | 13 | 5.5 | 33 |
| Example 5 | PET | 25 | 0.20 | 35 | 55 | 0.20 | 118 | 14 | 5.5 | 37 |
| Example 6 | PET | 27 | 0.20 | 35 | 55 | 0.20 | 120 | 15 | 5.5 | 40 |
| Example 7 | PET | 23 | 0.20 | 33 | 55 | 0.20 | 114 | 13 | 5.5 | 36 |
| Example 8 | PET | 25 | 0.20 | 33 | 55 | 0.20 | 116 | 14 | 5.5 | 39 |
| Example 9 | PET | 23 | 0.20 | 37 | 60 | 0.20 | 123 | 13 | 5.5 | 25 |
| Example 10 | PET | 25 | 0.20 | 37 | 60 | 0.20 | 125 | 14 | 5.5 | 29 |
| Example 11 | PET | 27 | 0.20 | 37 | 60 | 0.20 | 127 | 15 | 5.5 | 33 |
| Example 12 | PET | 23 | 0.20 | 35 | 60 | 0.20 | 121 | 13 | 5.5 | 28 |
| Example 13 | PET | 25 | 0.20 | 35 | 60 | 0.20 | 123 | 14 | 5.5 | 32 |
| Example 14 | PET | 27 | 0.20 | 35 | 60 | 0.20 | 125 | 15 | 5.5 | 35 |
| Example 15 | PET | 23 | 0.20 | 33 | 60 | 0.20 | 119 | 13 | 5.5 | 31 |
| Example 16 | PET | 25 | 0.20 | 33 | 60 | 0.20 | 121 | 14 | 5.5 | 34 |
| Example 17 | PET | 27 | 0.20 | 33 | 60 | 0.20 | 123 | 15 | 5.5 | 38 |
| Example 18 | PET | 23 | 0.20 | 37 | 65 | 0.20 | 128 | 13 | 5.5 | 20 |
| Example 19 | PET | 25 | 0.20 | 37 | 65 | 0.20 | 130 | 14 | 5.5 | 24 |
| Example 20 | PET | 23 | 0.20 | 35 | 65 | 0.20 | 126 | 13 | 5.5 | 23 |
| Example 21 | PET | 25 | 0.20 | 35 | 65 | 0.20 | 128 | 14 | 5.5 | 27 |
| Example 22 | PET | 27 | 0.20 | 35 | 65 | 0.20 | 130 | 15 | 5.5 | 30 |
| Example 23 | PET | 23 | 0.20 | 33 | 65 | 0.20 | 124 | 13 | 5.5 | 26 |
| Example 24 | PET | 25 | 0.20 | 33 | 65 | 0.20 | 126 | 14 | 5.5 | 29 |
| Example 25 | PET | 27 | 0.20 | 33 | 65 | 0.20 | 128 | 15 | 5.5 | 33 |
| Example 26 | PET | 23 | 0.25 | 37 | 60 | 0.25 | 123 | 13 | 4.0 | 25 |
| Example 27 | PET | 25 | 0.25 | 37 | 60 | 0.25 | 125 | 14 | 4.0 | 29 |
| Example 28 | PET | 27 | 0.25 | 37 | 60 | 0.25 | 127 | 15 | 4.0 | 33 |
| Example 29 | PET | 23 | 0.25 | 35 | 60 | 0.25 | 121 | 13 | 4.0 | 28 |
| Example 30 | PET | 25 | 0.25 | 35 | 60 | 0.25 | 123 | 14 | 4.0 | 32 |
| Example 31 | PET | 27 | 0.25 | 35 | 60 | 0.25 | 125 | 15 | 4.0 | 35 |
| Example 32 | PET | 23 | 0.25 | 33 | 60 | 0.25 | 119 | 13 | 4.0 | 31 |
| Example 33 | PET | 25 | 0.25 | 33 | 60 | 0.25 | 121 | 14 | 4.0 | 34 |
| Example 34 | PET | 27 | 0.25 | 33 | 60 | 0.25 | 123 | 15 | 4.0 | 38 |
| Example 35 | PET | 23 | 0.20 | 37 | 60 | 0.25 | 123 | 13 | 5.0 | 25 |
| Example 36 | PET | 25 | 0.20 | 37 | 60 | 0.25 | 125 | 14 | 5.0 | 29 |
| Example 37 | PET | 27 | 0.20 | 37 | 60 | 0.25 | 127 | 15 | 5.0 | 33 |
| Example 38 | PET | 23 | 0.20 | 35 | 60 | 0.25 | 121 | 13 | 5.0 | 28 |
| Example 39 | PET | 25 | 0.20 | 35 | 60 | 0.25 | 123 | 14 | 5.0 | 32 |
| Example 40 | PET | 27 | 0.20 | 35 | 60 | 0.25 | 125 | 15 | 5.0 | 35 |

TABLE 1-continued

| | Base material layer | | | Aluminum alloy foil | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | Thickness (μm) | Thickness (μm) | Thickness (μm) | | | | |
| Example 41 | PET | 23 | 0.20 | 33 | 60 | 0.25 | 119 | 13 | 5.0 | 31 |
| Example 42 | PET | 25 | 0.20 | 33 | 60 | 0.25 | 121 | 14 | 5.0 | 34 |
| Example 43 | PET | 27 | 0.20 | 33 | 60 | 0.25 | 123 | 15 | 5.0 | 38 |
| Example 44 | PET | 23 | 0.25 | 37 | 60 | 0.20 | 123 | 13 | 4.5 | 25 |
| Example 45 | PET | 25 | 0.25 | 37 | 60 | 0.20 | 125 | 14 | 4.5 | 29 |
| Example 46 | PET | 27 | 0.25 | 37 | 60 | 0.20 | 127 | 15 | 4.5 | 33 |
| Example 47 | PET | 23 | 0.25 | 35 | 60 | 0.20 | 121 | 13 | 4.5 | 28 |
| Example 48 | PET | 25 | 0.25 | 35 | 60 | 0.20 | 123 | 14 | 4.5 | 32 |
| Example 49 | PET | 27 | 0.25 | 35 | 60 | 0.20 | 125 | 15 | 4.5 | 35 |
| Example 50 | PET | 23 | 0.25 | 33 | 60 | 0.20 | 119 | 13 | 4.5 | 31 |
| Example 51 | PET | 25 | 0.25 | 33 | 60 | 0.20 | 121 | 14 | 4.5 | 34 |
| Example 52 | PET | 27 | 0.25 | 33 | 60 | 0.20 | 123 | 15 | 4.5 | 38 |

TABLE 2

| | Base material layer | | | Aluminum alloy foil layer Thickness (μm) | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | | Thickness (μm) | Dynamic friction coefficient | | | | |
| Comparative Example 1 | ONy | 15 | 0.20 | 40 | 100 | 0.20 | 158 | 3 | 6.5 | 0 |
| Comparative Example 2 | ONy | 25 | 0.20 | 40 | 100 | 0.20 | 168 | 5 | 7.5 | 0 |
| Comparative Example 3 | PET | 5 | 0.20 | 40 | 100 | 0.20 | 148 | 1 | 3.0 | 0 |
| Comparative Example 4 | PET | 9 | 0.20 | 40 | 100 | 0.20 | 152 | 4 | 3.5 | 0 |
| Comparative Example 5 | PET | 12 | 0.20 | 40 | 100 | 0.20 | 155 | 7 | 4.0 | 0 |
| Comparative Example 6 | PET | 16 | 0.20 | 40 | 100 | 0.20 | 159 | 9 | 4.5 | 0 |
| Comparative Example 7 | PET | 50 | 0.20 | 40 | 100 | 0.20 | 193 | 32 | 5.5 | 30 |
| Comparative Example 8 | PET/ONy | 30 | 0.20 | 40 | 100 | 0.20 | 173 | 6 | 5.5 | 0 |
| Comparative Example 9 | ONy | 15 | 0.20 | 30 | 100 | 0.20 | 148 | 3 | 6.0 | 0 |
| Comparative Example 10 | ONy | 25 | 0.20 | 30 | 100 | 0.20 | 158 | 5 | 7.0 | 0 |
| Comparative Example 11 | PET | 5 | 0.20 | 30 | 100 | 0.20 | 138 | 1 | 2.5 | 0 |
| Comparative Example 12 | PET | 9 | 0.20 | 30 | 100 | 0.20 | 142 | 4 | 3.0 | 0 |
| Comparative Example 13 | PET | 12 | 0.20 | 30 | 100 | 0.20 | 145 | 7 | 3.5 | 0 |
| Comparative Example 14 | PET | 16 | 0.20 | 30 | 100 | 0.20 | 149 | 9 | 4.0 | 0 |
| Comparative Example 15 | PET | 50 | 0.20 | 30 | 100 | 0.20 | 183 | 32 | 5.0 | 43 |
| Comparative Example 16 | PET/ONy | 30 | 0.20 | 30 | 100 | 0.20 | 163 | 6 | 5.0 | 0 |
| Comparative Example 17 | ONy | 15 | 0.20 | 20 | 100 | 0.20 | 138 | 3 | 5.0 | 0 |
| Comparative Example 18 | ONy | 25 | 0.20 | 20 | 100 | 0.20 | 148 | 5 | 6.0 | 1 |
| Comparative Example 19 | PET | 5 | 0.20 | 20 | 100 | 0.20 | 128 | 1 | 2.0 | 0 |
| Comparative Example 20 | PET | 9 | 0.20 | 20 | 100 | 0.20 | 132 | 4 | 2.5 | 0 |
| Comparative Example 21 | PET | 12 | 0.20 | 20 | 100 | 0.20 | 135 | 7 | 3.0 | 0 |

TABLE 2-continued

| | Base material layer | | | Aluminum alloy foil layer Thickness (µm) | Heat-sealable resin layer | | Total thickness of battery packaging material (µm) | Dielectric breakdown voltage of polyester film layer-side surface (kv) | Molded depth (mm) | Molded curl (mm) |
|---|---|---|---|---|---|---|---|---|---|---|
| | Type | Thickness (µm) | Dynamic friction coefficient | | Thickness (µm) | Dynamic friction coefficient | | | | |
| Comparative Example 22 | PET | 16 | 0.20 | 20 | 100 | 0.20 | 139 | 9 | 3.5 | 0 |
| Comparative Example 23 | PET | 50 | 0.20 | 20 | 100 | 0.20 | 173 | 32 | 4.5 | 56 |
| Comparative Example 24 | PET/ONy | 30 | 0.20 | 20 | 100 | 0.20 | 153 | 6 | 4.5 | 9 |
| Comparative Example 25 | ONy | 15 | 0.20 | 40 | 80 | 0.20 | 138 | 3 | 6.5 | 0 |
| Comparative Example 26 | ONy | 25 | 0.20 | 40 | 80 | 0.20 | 148 | 5 | 7.5 | 0 |
| Comparative Example 27 | PET | 5 | 0.20 | 40 | 80 | 0.20 | 128 | 1 | 3.0 | 0 |
| Comparative Example 28 | PET | 9 | 0.20 | 40 | 80 | 0.20 | 132 | 4 | 3.5 | 0 |
| Comparative Example 29 | PET | 12 | 0.20 | 40 | 80 | 0.20 | 135 | 7 | 4.0 | 0 |
| Comparative Example 30 | PET | 16 | 0.20 | 40 | 80 | 0.20 | 139 | 9 | 4.5 | 0 |
| Comparative Example 31 | PET | 50 | 0.20 | 40 | 80 | 0.20 | 173 | 32 | 5.5 | 50 |
| Comparative Example 32 | PET/ONy | 30 | 0.20 | 40 | 80 | 0.20 | 153 | 6 | 5.5 | 3 |
| Comparative Example 33 | ONy | 15 | 0.20 | 30 | 80 | 0.20 | 128 | 3 | 6.0 | 0 |
| Comparative Example 34 | ONy | 25 | 0.20 | 30 | 80 | 0.20 | 138 | 5 | 7.0 | 8 |
| Comparative Example 35 | PET | 5 | 0.20 | 30 | 80 | 0.20 | 118 | 1 | 2.5 | 0 |
| Comparative Example 36 | PET | 9 | 0.20 | 30 | 80 | 0.20 | 122 | 4 | 3.0 | 0 |
| Comparative Example 37 | PET | 12 | 0.20 | 30 | 80 | 0.20 | 125 | 7 | 3.5 | 0 |
| Comparative Example 38 | PET | 16 | 0.20 | 30 | 80 | 0.20 | 129 | 9 | 4.0 | 2 |
| Comparative Example 39 | PET | 50 | 0.20 | 30 | 80 | 0.20 | 163 | 32 | 5.0 | 63 |
| Comparative Example 40 | PET/ONy | 30 | 0.20 | 30 | 80 | 0.20 | 143 | 6 | 5.0 | 16 |
| Comparative Example 41 | ONy | 15 | 0.20 | 20 | 80 | 0.20 | 118 | 3 | 5.0 | 7 |
| Comparative Example 42 | ONy | 25 | 0.20 | 20 | 80 | 0.20 | 128 | 5 | 6.0 | 21 |
| Comparative Example 43 | PET | 5 | 0.20 | 20 | 80 | 0.20 | 108 | 1 | 2.0 | 0 |
| Comparative Example 44 | PET | 9 | 0.20 | 20 | 80 | 0.20 | 112 | 4 | 2.5 | 3 |
| Comparative Example 45 | PET | 12 | 0.20 | 20 | 80 | 0.20 | 115 | 7 | 3.0 | 8 |
| Comparative Example 46 | PET | 16 | 0.20 | 20 | 80 | 0.20 | 119 | 9 | 3.5 | 15 |
| Comparative Example 47 | PET | 50 | 0.20 | 20 | 80 | 0.20 | 153 | 32 | 4.5 | 76 |
| Comparative Example 48 | PET/ONy | 30 | 0.20 | 20 | 80 | 0.20 | 133 | 6 | 4.5 | 29 |
| Comparative Example 49 | ONy | 15 | 0.20 | 40 | 70 | 0.20 | 128 | 3 | 6.5 | 0 |
| Comparative Example 50 | ONy | 25 | 0.20 | 40 | 70 | 0.20 | 138 | 5 | 7.5 | 5 |

TABLE 3

| | Base material layer | | | Aluminum alloy foil layer Thickness (μm) | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | | Thickness (μm) | Dynamic friction coefficient | | | | |
| Comparative Example 51 | PET | 5 | 0.20 | 40 | 70 | 0.20 | 118 | 1 | 3.0 | 0 |
| Comparative Example 52 | PET | 9 | 0.20 | 40 | 70 | 0.20 | 122 | 4 | 3.5 | 0 |
| Comparative Example 53 | PET | 12 | 0.20 | 40 | 70 | 0.20 | 125 | 7 | 4.0 | 0 |
| Comparative Example 54 | PET | 16 | 0.20 | 40 | 70 | 0.20 | 129 | 9 | 4.5 | 0 |
| Comparative Example 55 | PET | 50 | 0.20 | 40 | 70 | 0.20 | 163 | 32 | 5.5 | 60 |
| Comparative Example 56 | PET/ONy | 30 | 0.20 | 40 | 70 | 0.20 | 143 | 6 | 5.5 | 12 |
| Comparative Example 57 | ONy | 15 | 0.20 | 30 | 70 | 0.20 | 118 | 3 | 6.0 | 4 |
| Comparative Example 58 | ONy | 25 | 0.20 | 30 | 70 | 0.20 | 128 | 5 | 7.0 | 18 |
| Comparative Example 59 | PET | 5 | 0.20 | 30 | 70 | 0.20 | 108 | 1 | 2.5 | 0 |
| Comparative Example 60 | PET | 9 | 0.20 | 30 | 70 | 0.20 | 112 | 4 | 3.0 | 0 |
| Comparative Example 61 | PET | 12 | 0.20 | 30 | 70 | 0.20 | 115 | 7 | 3.5 | 5 |
| Comparative Example 62 | PET | 16 | 0.20 | 30 | 70 | 0.20 | 119 | 9 | 4.0 | 12 |
| Comparative Example 63 | PET | 50 | 0.20 | 30 | 70 | 0.20 | 153 | 32 | 5.0 | 73 |
| Comparative Example 64 | PET/ONy | 30 | 0.20 | 30 | 70 | 0.20 | 133 | 6 | 5.0 | 25 |
| Comparative Example 65 | ONy | 15 | 0.20 | 20 | 70 | 0.20 | 108 | 3 | 5.0 | 17 |
| Comparative Example 66 | ONy | 25 | 0.20 | 20 | 70 | 0.20 | 118 | 5 | 6.0 | 31 |
| Comparative Example 67 | PET | 5 | 0.20 | 20 | 70 | 0.20 | 98 | 1 | 2.0 | 6 |
| Comparative Example 68 | PET | 9 | 0.20 | 20 | 70 | 0.20 | 102 | 4 | 2.5 | 13 |
| Comparative Example 69 | PET | 12 | 0.20 | 20 | 70 | 0.20 | 105 | 7 | 3.0 | 18 |
| Comparative Example 70 | PET | 16 | 0.20 | 20 | 70 | 0.20 | 109 | 9 | 3.5 | 25 |
| Comparative Example 71 | PET | 50 | 0.20 | 20 | 70 | 0.20 | 143 | 32 | 4.5 | 86 |
| Comparative Example 72 | PET/ONy | 30 | 0.20 | 20 | 70 | 0.20 | 123 | 6 | 4.5 | 38 |
| Comparative Example 73 | ONy | 15 | 0.20 | 40 | 50 | 0.20 | 108 | 3 | 6.5 | 11 |
| Comparative Example 74 | ONy | 25 | 0.20 | 40 | 50 | 0.20 | 118 | 5 | 7.5 | 24 |
| Comparative Example 75 | PET | 5 | 0.20 | 40 | 50 | 0.20 | 98 | 1 | 3.0 | 0 |
| Comparative Example 76 | PET | 9 | 0.20 | 40 | 50 | 0.20 | 102 | 4 | 3.5 | 6 |
| Comparative Example 77 | PET | 12 | 0.20 | 40 | 50 | 0.20 | 105 | 7 | 4.0 | 12 |
| Comparative Example 78 | PET | 16 | 0.20 | 40 | 50 | 0.20 | 109 | 9 | 4.5 | 19 |
| Comparative Example 79 | PET | 50 | 0.20 | 40 | 50 | 0.20 | 143 | 32 | 5.5 | 80 |
| Comparative Example 80 | PET/ONy | 30 | 0.20 | 40 | 50 | 0.20 | 123 | 6 | 5.5 | 32 |
| Comparative Example 81 | ONy | 15 | 0.20 | 30 | 50 | 0.20 | 98 | 3 | 6.0 | 24 |
| Comparative Example 82 | ONy | 25 | 0.20 | 30 | 50 | 0.20 | 108 | 5 | 7.0 | 37 |
| Comparative Example 83 | PET | 5 | 0.20 | 30 | 50 | 0.20 | 88 | 1 | 2.5 | 12 |
| Comparative Example 84 | PET | 9 | 0.20 | 30 | 50 | 0.20 | 92 | 4 | 3.0 | 19 |
| Comparative Example 85 | PET | 12 | 0.20 | 30 | 50 | 0.20 | 95 | 7 | 3.5 | 25 |

TABLE 3-continued

| | Base material layer | | | Aluminum alloy foil layer Thickness (μm) | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | | Thickness (μm) | Dynamic friction coefficient | | | | |
| Comparative Example 86 | PET | 16 | 0.20 | 30 | 50 | 0.20 | 99 | 9 | 4.0 | 32 |
| Comparative Example 87 | PET | 50 | 0.20 | 30 | 50 | 0.20 | 133 | 32 | 5.0 | 93 |
| Comparative Example 88 | PET/ONy | 30 | 0.20 | 30 | 50 | 0.20 | 113 | 6 | 5.0 | 45 |
| Comparative Example 89 | ONy | 15 | 0.20 | 20 | 50 | 0.20 | 88 | 3 | 5.0 | 37 |
| Comparative Example 90 | ONy | 25 | 0.20 | 20 | 50 | 0.20 | 98 | 5 | 6.0 | 50 |
| Comparative Example 91 | PET | 5 | 0.20 | 20 | 50 | 0.20 | 78 | 1 | 2.0 | 25 |
| Comparative Example 92 | PET | 9 | 0.20 | 20 | 50 | 0.20 | 82 | 4 | 2.5 | 32 |
| Comparative Example 93 | PET | 12 | 0.20 | 20 | 50 | 0.20 | 85 | 7 | 3.0 | 38 |
| Comparative Example 94 | PET | 16 | 0.20 | 20 | 50 | 0.20 | 89 | 9 | 3.5 | 45 |
| Comparative Example 95 | PET | 50 | 0.20 | 20 | 50 | 0.20 | 123 | 32 | 4.5 | 105 |
| Comparative Example 96 | PET/ONy | 30 | 0.20 | 20 | 50 | 0.20 | 103 | 6 | 4.5 | 58 |

TABLE 4

| | Base material layer | | | Aluminum alloy foil layer Thickness (μm) | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | | Thickness (μm) | Dynamic friction coefficient | | | | |
| Comparative Example 97 | PET | 5 | 0.20 | 30 | 50 | 0.20 | 88 | 1 | 2.5 | 12 |
| Comparative Example 98 | PET | 9 | 0.20 | 30 | 50 | 0.20 | 92 | 4 | 3.0 | 19 |
| Comparative Example 99 | PET | 12 | 0.20 | 30 | 50 | 0.20 | 95 | 7 | 3.5 | 25 |
| Comparative Example 100 | PET | 16 | 0.20 | 30 | 50 | 0.20 | 99 | 9 | 4.0 | 35 |
| Comparative Example 101 | PET | 25 | 0.20 | 30 | 50 | 0.20 | 108 | 14 | 4.5 | 46 |
| Comparative Example 102 | PET | 50 | 0.20 | 30 | 50 | 0.20 | 133 | 32 | 5.0 | 93 |
| Comparative Example 103 | PET | 5 | 0.20 | 35 | 50 | 0.20 | 93 | 1 | 2.6 | 7 |
| Comparative Example 104 | PET | 9 | 0.20 | 35 | 50 | 0.20 | 97 | 4 | 3.2 | 11 |
| Comparative Example 105 | PET | 12 | 0.20 | 35 | 50 | 0.20 | 100 | 7 | 3.8 | 18 |
| Comparative Example 106 | PET | 16 | 0.20 | 35 | 50 | 0.20 | 104 | 9 | 4.1 | 38 |
| Comparative Example 107 | PET | 25 | 0.20 | 35 | 50 | 0.20 | 113 | 14 | 4.7 | 44 |
| Comparative Example 108 | PET | 50 | 0.20 | 35 | 50 | 0.20 | 138 | 32 | 5.2 | 87 |
| Comparative Example 109 | PET | 5 | 0.20 | 40 | 50 | 0.20 | 98 | 1 | 3.0 | 0 |
| Comparative Example 110 | PET | 9 | 0.20 | 40 | 50 | 0.20 | 102 | 4 | 3.5 | 6 |
| Comparative Example 111 | PET | 12 | 0.20 | 40 | 50 | 0.20 | 105 | 7 | 4.0 | 12 |
| Comparative Example 112 | PET | 16 | 0.20 | 40 | 50 | 0.20 | 109 | 9 | 4.5 | 19 |
| Comparative Example 113 | PET | 50 | 0.20 | 40 | 50 | 0.20 | 143 | 32 | 5.5 | 80 |

TABLE 4-continued

| | | Base material layer | | Aluminum alloy foil layer | Heat-sealable resin layer | | Total thickness of battery packaging material (μm) | Dielectric breakdown voltage of polyester film layer-side surface (kv) | Molded depth (mm) | Molded curl (mm) |
|---|---|---|---|---|---|---|---|---|---|---|
| | Type | Thickness (μm) | Dynamic friction coefficient | Thickness (μm) | Thickness (μm) | Dynamic friction coefficient | | | | |
| Comparative Example 114 | PET | 5 | 0.20 | 30 | 60 | 0.20 | 98 | 1 | 2.5 | 0 |
| Comparative Example 115 | PET | 9 | 0.20 | 30 | 60 | 0.20 | 102 | 4 | 3.0 | 4 |
| Comparative Example 116 | PET | 12 | 0.20 | 30 | 60 | 0.20 | 105 | 7 | 3.5 | 12 |
| Comparative Example 117 | PET | 16 | 0.20 | 30 | 60 | 0.20 | 109 | 9 | 4.0 | 19 |
| Comparative Example 118 | PET | 50 | 0.20 | 30 | 60 | 0.20 | 143 | 32 | 5.0 | 80 |
| Comparative Example 119 | PET | 5 | 0.20 | 35 | 60 | 0.20 | 103 | 1 | 2.6 | 0 |
| Comparative Example 120 | PET | 9 | 0.20 | 35 | 60 | 0.20 | 107 | 4 | 3.2 | 0 |
| Comparative Example 121 | PET | 12 | 0.20 | 35 | 60 | 0.20 | 110 | 7 | 3.8 | 7 |
| Comparative Example 122 | PET | 16 | 0.20 | 35 | 60 | 0.20 | 114 | 9 | 4.1 | 10 |
| Comparative Example 123 | PET | 50 | 0.20 | 35 | 60 | 0.20 | 148 | 32 | 5.2 | 75 |
| Comparative Example 124 | PET | 5 | 0.20 | 40 | 60 | 0.20 | 108 | 1 | 3.0 | 0 |
| Comparative Example 125 | PET | 9 | 0.20 | 40 | 60 | 0.20 | 112 | 4 | 3.5 | 0 |
| Comparative Example 126 | PET | 12 | 0.20 | 40 | 60 | 0.20 | 115 | 7 | 4.0 | 0 |
| Comparative Example 127 | PET | 16 | 0.20 | 40 | 60 | 0.20 | 119 | 9 | 4.5 | 5 |
| Comparative Example 128 | PET | 50 | 0.20 | 40 | 60 | 0.20 | 153 | 32 | 5.5 | 70 |
| Comparative Example 129 | PET | 5 | 0.20 | 30 | 100 | 0.20 | 138 | 1 | 2.5 | 0 |
| Comparative Example 130 | PET | 9 | 0.20 | 30 | 100 | 0.20 | 142 | 4 | 3.0 | 0 |
| Comparative Example 131 | PET | 12 | 0.20 | 30 | 100 | 0.20 | 145 | 7 | 3.5 | 0 |
| Comparative Example 132 | PET | 16 | 0.20 | 30 | 100 | 0.20 | 149 | 9 | 4.0 | 0 |
| Comparative Example 133 | PET | 25 | 0.20 | 30 | 100 | 0.20 | 158 | 14 | 4.5 | 17 |
| Comparative Example 134 | PET | 50 | 0.20 | 30 | 100 | 0.20 | 183 | 32 | 5.0 | 43 |
| Comparative Example 135 | PET | 5 | 0.20 | 35 | 100 | 0.20 | 143 | 1 | 2.6 | 0 |
| Comparative Example 136 | PET | 9 | 0.20 | 35 | 100 | 0.20 | 147 | 4 | 3.3 | 0 |
| Comparative Example 137 | PET | 12 | 0.20 | 35 | 100 | 0.20 | 150 | 7 | 3.8 | 0 |
| Comparative Example 138 | PET | 16 | 0.20 | 35 | 100 | 0.20 | 154 | 9 | 4.4 | 0 |
| Comparative Example 139 | PET | 25 | 0.20 | 35 | 100 | 0.20 | 163 | 14 | 4.7 | 14 |
| Comparative Example 140 | PET | 50 | 0.20 | 35 | 100 | 0.20 | 188 | 32 | 5.3 | 36 |
| Comparative Example 141 | PET | 5 | 0.20 | 40 | 100 | 0.20 | 148 | 1 | 3.0 | 0 |
| Comparative Example 142 | PET | 9 | 0.20 | 40 | 100 | 0.20 | 152 | 4 | 3.5 | 0 |
| Comparative Example 143 | PET | 12 | 0.20 | 40 | 100 | 0.20 | 155 | 7 | 4.0 | 0 |
| Comparative Example 144 | PET | 16 | 0.20 | 40 | 100 | 0.20 | 159 | 9 | 4.5 | 0 |
| Comparative Example 145 | PET | 25 | 0.20 | 40 | 100 | 0.20 | 168 | 14 | 5.0 | 12 |
| Comparative Example 146 | PET | 50 | 0.20 | 40 | 100 | 0.20 | 193 | 32 | 5.5 | 30 |

In Tables 1 to 4, PET is a stretched polyethylene terephthalate film, ONy is a stretched nylon film, and PET/ONy is a laminate of PET and ONy (PET is positioned on the side opposite to the aluminum alloy foil layer, and PET and ONy are adhered to each other via an adhesive agent (polyester urethane, thickness of 3 μm)). For PET/ONy (thickness of 30 μm), PET 12 μm and ONy 15 μm are used.

As apparent from the results shown in Tables 1-4, in a battery packaging material configured from a laminate which is at least provided with a polyester film layer, an aluminum alloy foil layer and a heat-sealable resin layer in this order, the battery packaging materials of Examples 1 to 52 having a specific composition and thickness such that the thickness of the polyester film layer is 23 μm or more and 27 μm or less, the thickness of the aluminum alloy foil layer is 33 μm or more and 37 μm or less, the thickness of the heat-sealable resin layer is 55 μm or more and 65 μm or less, and the thickness of the laminate is 130 μm or less has a high surface insulation quality with a dielectric breakdown voltage of the polyester film layer-side surface of 13 kV or more, has excellent moldability and prevents curling after molding. On the other hand, in Comparative Examples 1-146, at least one of evaluations for the surface insulation quality, moldability and curling after molding was so inferior to those for Examples 1 to 52 that excellent properties for all of the evaluation items cannot be simultaneously exerted.

DESCRIPTION OF REFERENCE SIGNS

1: Polyester film layer
2: Adhesive agent layer
3: Aluminum alloy foil layer
4: Heat-sealable resin layer
5: Adhesive layer
6: Surface coating layer
10: Battery packaging material
20: Horizontal plane
d: Shortest distance between molded part and end part of battery packaging material
M: Molded part
P: End part of battery packaging material
t: Maximum value of distance in vertical direction from horizontal plane to end part

The invention claimed is:

1. A battery packaging material configured from a laminate which is at least provided with a polyester film layer, an aluminum alloy foil layer and a heat-sealable resin layer in this order, wherein
a thickness of the polyester film layer is 23 μm or more and 27 μm or less,
a thickness of the aluminum alloy foil layer is 33 μm or more and 37 μm or less,
a thickness of the heat-sealable resin layer is 55 μm or more and 65 μm or less,
a thickness of the laminate is 130 μm or less, and
a dielectric breakdown voltage of a surface on a side of the polyester film layer is 13 kV or more.

2. The battery packaging material according to claim 1, wherein a dynamic friction coefficient of a surface on a side of the polyester film layer measured in accordance with provisions of JIS K7125: 1995 is 0.25 or less.

3. The battery packaging material according to claim 1, wherein a dynamic friction coefficient of a surface on a side of the heat-sealable resin layer measured in accordance with provisions of JIS K7125: 1995 is 0.25 or less.

4. The battery packaging material according to claim 1, wherein a critical molded depth when molded under the following conditions is 4.0 mm or more:
for each of 10 samples:
(a) a rectangular piece of the battery packaging material having a length of 150 mm and a width of 100 mm is used as a test sample;
(b) using a rectangular female mold having an opening size of 55×32 mm and a corresponding male mold, the sample is cold-molded while the molded depth is changed by units of 0.5 mm from a molded depth of 0.5 mm under a surface-pressing force of 0.23 MPa;
(c) at this time, the test sample is placed on the female mold such that a heat-sealable resin layer side is positioned on a male mold side for molding;
(d) clearance between the male and female molds is set to 0.5 mm;
(e) for the sample after the cold molding, a deepest molded depth at which no pinhole or crack occurs in the aluminum alloy foil layer for all 10 samples is defined as A mm, and a number of samples having a pinhole or crack generated in the aluminum alloy foil layer at a shallowest molded depth at which a pinhole or crack occurs is defined as B; and
(f) then, a value calculated by the following formula is taken as the critical molded depth for the battery packaging material:

$$\text{Critical molded depth}=A\text{mm}+(0.5\text{ mm}/10)\times(10-B).$$

5. The battery packaging material according to claim 1, wherein a curl measured under the following conditions is 40 mm or less:
(a) a rectangular piece of the battery packaging material having a length of 150 mm and a width of 100 mm is used as a test sample;
(b) using a rectangular female mold having an opening size of 55×32 mm and a corresponding male mold, the sample is cold-molded while a molded depth is 6 mm under a surface-pressing force of 0.23 MPa;
(c) at this time, the test sample is placed on the female mold such that a heat-sealable resin layer side is positioned on a male mold side for molding;
(d) clearance between the male and female molds is set to 0.5 mm;
(e) a position of a molded part M is a position where in a longitudinal direction of the battery packaging material, a shortest distance d between a rectangular molded part M formed by a die and an end part P of the battery packaging material becomes 72 mm, and in a width direction of the battery packaging material, a shortest distance between the molded part M and either end of the battery packaging material becomes 34 mm; and
(f) when the battery packaging material is placed on a horizontal plane such that an opening of a recess portion of the molded part faces downward, a maximum value t of a distance in a vertical direction y from the horizontal plane to the end part P is defined as a curl (mm).

6. The battery packaging material according to claim 1, wherein the polyester film layer is configured from a stretched polyethylene terephthalate film.

7. The battery packaging material according to claim 1, wherein the heat-sealable resin layer is configured from a random polypropylene film.

8. The battery packaging material according to claim 1, wherein the aluminum alloy foil layer is configured from an aluminum alloy having the composition defined in JIS H4160: 1994 A8021H-O.

9. The battery packaging material according to claim 1, which is used for a vehicle battery.

10. A battery, wherein battery elements including a positive electrode, a negative electrode and an electrolyte are stored in a packaging formed of the battery packaging material according to claim 1.

11. The battery packaging material according to claim 1, wherein the laminate further comprises an adhesive layer that directly contacts the polyester film layer and the aluminum alloy foil layer.

12. The battery packaging material according to claim 11, wherein the adhesive layer has a monolayer structure.

* * * * *